(12) United States Patent
Ono et al.

(10) Patent No.: US 7,440,217 B2
(45) Date of Patent: Oct. 21, 2008

(54) ON THE FLY WRITE HEAD FLYHEIGHT DETECTOR

(75) Inventors: Hiroyuki Ono, Kanagawa (JP); Nobumasa Nishiyama, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 19 days.

(21) Appl. No.: 11/337,113

(22) Filed: Jan. 19, 2006

(65) Prior Publication Data

US 2006/0158769 A1    Jul. 20, 2006

(30) Foreign Application Priority Data

Jan. 20, 2005 (JP) ............... 2005-012275

(51) Int. Cl.
*G11B 21/02* (2006.01)
(52) U.S. Cl. ............................................. 360/75
(58) Field of Classification Search ............ 360/75, 360/68, 69, 55, 77.01, 31, 128, 6; 73/105
See application file for complete search history.

(56) References Cited

U.S. PATENT DOCUMENTS

| 6,275,358 | B1 * | 8/2001 | Balakrishnan et al. | 360/264.2 |
| 7,046,473 | B2 * | 5/2006 | Fu et al. | 360/75 |
| 7,095,587 | B2 * | 8/2006 | Kurita et al. | 360/128 |
| 7,171,845 | B2 * | 2/2007 | Mate et al. | 73/105 |
| 7,298,566 | B2 * | 11/2007 | Ueda et al. | 360/31 |
| 2004/0184177 | A1 | 9/2004 | Doi et al. | |
| 2006/0056091 | A1 * | 3/2006 | Nagano et al. | 360/55 |
| 2006/0119974 | A1 * | 6/2006 | Yamazaki et al. | 360/75 |
| 2007/0014041 | A1 * | 1/2007 | Lille et al. | 360/6 |

FOREIGN PATENT DOCUMENTS

| JP | 05-020635 | 1/1993 |
| JP | 2000-195211 | 7/2000 |
| JP | 2001-356002 | 12/2001 |
| JP | 2003-007017 | 1/2003 |

* cited by examiner

*Primary Examiner*—Fred Tzeng
(74) *Attorney, Agent, or Firm*—Townsend and Townsend and Crew LLP; Rambod Nader

(57) ABSTRACT

Embodiments of the invention measure a flying height of a recording head. According to one embodiment, in a magnetic circuit comprising a recording head and a magnetic disk, a magnetic resistance changes when a flying height of a recording head fluctuates. A change in an impedance of a recording circuit is measured by making use of a recording current flown in a recording head when recording data indicates a change of a flying height of the recording head during data recording. The measured flying height can be used for stabilizing a recording operation in the magnetic disk device. This method is especially effective in a magnetic disk device based on the perpendicular magnetic recording system because an impedance largely changes in this type of magnetic disk device.

18 Claims, 11 Drawing Sheets

(A)

(B)

ON THE FLY WRITE HEAD FLYHEIGHT DETECTOR

CROSS-REFERENCES TO RELATED APPLICATIONS

This application claims priority from Japanese Patent Application No. JP2005-012275, filed Jan. 20, 2005, the entire disclosure of which is incorporated herein by reference.

BACKGROUND OF THE INVENTION

The present invention relates to a technique for measuring a flying height of a recording head in a magnetic disk device, and more particularly to a technique for measuring a flying height of a recording head to execute recording operations in the stable state.

In a magnetic disk device, a magnetic head floats over a magnetic disk as a recording medium to record data at or reproduce data stored at a specified position of the magnetic disk. The magnetic head is embedded in a slider, and the magnetic head and the slider form a head/slider. The head/slider is attached to a suspension assembly and is positioned by an actuator on a specified position in the radial direction of the magnetic disk.

Recent magnetic heads have the structure in which an MR head or a GMR head constituting a reproduction element and an induction type of head constituting a recording head are separated from each other and are embedded in the same slider. The head/slider receives a buoyancy by an air flow generated on a surface of the turning magnetic disk with an air bearing surface (described as ABS hereinafter) which is a surface facing against the magnetic disk and floats over the magnetic disk. A physical clearance between the head/slider and a magnetic disk surface or a recording layer surface is generally called flying height.

Recently, in order to improve the recording density in a magnetic disk, attempts have been made to reduce a flight height of a head/slider, and monitoring and control over a flying height have become more and more important. A flying height depends on a form of an ABS of a head/slider, a mechanical structure of a suspension assembly supporting the head/slider, flatness of a surface of a turning magnetic disk and other factors, so that the flying height cannot be constant. When the flying height is too low, however, the ABS may collide with dust and the like on the magnetic disk, and a floating posture of the head/slider loses the stability, or collision between the magnetic disk and magnetic head may occur. When the flying height is too high, a magnetic coupling force between the magnetic head and the recording layer becomes weaker, and the recording or reproduction capability is degraded.

A flying height fluctuates even after shipment of a magnetic disk device due to such factors as distortion of the suspension mechanism across ages and also to environmental conditions for use thereof such as a temperature or an atmospheric pressure. It is difficult to measure a flying height in a shipped magnetic disk device with a specific device, but the technique for measuring fluctuations of a flying height by processing a signal reproduced from a magnetic disk with a reproduction head is described in patent document 1 (Japanese Patent Laid-Open No. 2001-195211). Patent document 2 (Japanese Patent Laid-Open No. 2004-281012) discloses a technique for controlling a recording current to cope with fluctuations of a flying height due to thermal expansion generated in a recording head by a recording current. Patent document 3 (Japanese Patent Laid-Open No. Hei 5-20635) discloses a technique for controlling a projection rate of a tip section of a magnetic polar due to thermal expansion by energizing a resistance body embedded around a thin film magnetic head element for heating it.

BRIEF SUMMARY OF THE INVENTION

Other than the method described in patent document 1, there is also the technique for measuring a flying height of a reproduction head by paying attention to change in frequency components of a reproduction signal for data recorded in a magnetic disk according to a flying height. However, although a recording head and a reproduction head are embedded in the same slider, there is a prespecified space between the recording head and the reproduction head. Because of this configuration, a space between the recording head and the reproduction head in the radial direction of the magnetic disk when the reproduction head is positioned at a prespecified position on the magnetic disk may sometimes correspond to several tracks or several tens of tracks apart due to the so-called yaw angle.

Therefore, a flying height measured by analyzing a reproduction signal is equivalent to a value based on a flying height of a reproduction head, but it cannot be said that the value is directly related to a flying height of a recording head. Further, even if one tries to estimate a flying height of a recording head when user data is being recorded in a magnetic disk from a flying height of a reproduction head, when the recording head is positioned on a recording position on a magnetic disk, the reproduction head is not always positioned at a center of a servo track or a center of a pattern to be measured, and therefore even though a reproduction signal is analyzed for the purpose to measure a flying height of the recording head, sometimes a flying height of the reproduction head cannot always be measured.

When servo data is utilized for measuring a flying height with a reproduction head, as servo data is written in servo tracks discretely arranged on a magnetic disk in the circumferential direction, so that, when the reproduction head floats between servo tracks, the flying height cannot be measured. Further sometimes the thermal protrusion or thermal expansion of a recording head which are factors completely independent from a floating rate of a head/slider may have some connections with a flying height of the recording head, and therefore accurate measurement of a flying height of a recording head has been desired. If a flying height of a recording head can accurately be measured, it becomes possible to improve reliability in data recording, for instance, by stopping a recording operation or controlling a flying height when the flying height is in the unstable condition.

To solve the problems as described above, it is a feature of the present invention to measure a flying height of a recording head. It is another feature of the present invention to provide a method of measuring a flying height of a recording head by making use of an impedance of a recording circuit comprising a recording head and wiring. It is still another feature of the present invention to provide a recording method with high reliability by measuring a flying height of a recording head. Further it is another feature of the present invention to provide a magnetic disk device capable of executing the method.

A principle of the present invention resides in that, for the purpose to measure a flying height of a recording head, a current is flown through a recording circuit consisting of a recording head and wiring to measure an impedance thereof. As an impedance of a recording circuit changes due to fluctuations of a flying height, also the current flowing through the recording circuit changes according to fluctuations of a flying height. By making use of this characteristic, it is possible to measure a flying height of a recording head from an impedance of the recording circuit measured based on a value of a current flowing through the recording circuit.

In this specification, a flying height is defined as a physical distance between a prespecified place on an ABS of a head/slider of a recording head or a reproduction head and a prespecified place on a protection film surface or a magnetic layer surface of a magnetic disk. The flying height means not only a physical distance but also means a representative value representing a flying height in some meaning or other, for instance, in a case where a flying height is expressed as a percentage against a reference value, or in a case where the term is used to represent some other performance relating to a flying height such as an impedance.

A first aspect of the present invention is a method of measuring a flying height of a recording head in a magnetic disk device, and this method comprises the steps of flowing a recording current in a recording circuit comprising said recording head and wiring connected to the recording head to record data in said magnetic disk, and measuring a flying height of the recording head from an impedance of the recording circuit obtained based on a value of the recording current.

In this first aspect, as a value of an impedance of a recording circuit obtained from a current flowing through the recording circuit is used, the measured flying height indicates that of the recording head or that directly connected to the recording head. Further when not a test current for measurement but a recording current for recording user data is flown through the recording circuit, a flying height of the recording head can be measured while recording the user data. When the magnetic disk device employs the perpendicular magnetic recording system, as a change rate of an impedance of a recording circuit against fluctuation of a flying height is larger as compared to that in a magnetic disk device based on the intra-surface magnetic recording system, and therefore the measurement precision can be improved.

A second aspect of the present invention is a method of recording user data with a magnetic disk device having a head/slider with a recording head formed thereon and a magnetic disk including a vertical recording layer, and this method comprises the steps of supplying a recording current to a recording circuit comprising the recording head and wiring connected to the recording head to start an operation for recording user data in the magnetic disk, measuring a flying height of the recording head from an impedance of the recording circuit obtained based on a value of the recording current, and stopping the recording operation based on the flying height.

When the measured flying height indicates any abnormality, it is possible to prevent from recording data at an erroneous position or performing an incomplete recording operation by stopping the recording operation. Further by restarting the recording operation when the flying height returns to the normal state, it is possible to maintain continuity of data recording when the head/slider collide with dust or any other foreign material on the magnetic disk and the flying height become transitionally abnormal.

A third aspect of the present invention is a method of recording user data with a magnetic disk device having a head/slider with a recording head formed thereon and a magnetic disk including a vertical recording layer, and this method comprises the steps of supplying a recording current to a recording circuit comprising the recording head and wiring connected to the recording head to start an operation for recording user data in the magnetic disk, measuring a flying height of the recording head from an impedance of the recording circuit obtained based on a value of the recording circuit, and adjusting a flying height of the recording head based on the flying height obtained as described above.

A fourth aspect of the present invention provides a magnetic disk device comprising a magnetic disk, a head/slider having a recording head for recording data in the magnetic disk formed thereon, wiring connected to the recording head, a head driver for generating a recording current to be supplied to the recording head, and a flying height measuring circuit connected to the head driver as well as to the wiring for measuring an impedance of a recording circuit comprising the wiring and recording head from a recording current flowing through the wiring and outputting a flying height of the recording head.

With the present invention, it is possible to provide a method of measuring a flying height of according to a recording head. With the present invention, it is possible to provide a method of measuring a flying height of a recording head by making use of an impedance of a recording circuit comprising a recording head and wiring. With the present invention, it is possible to provide a recording method with a high reliability by measuring a flying height of a recording head. Further with the present invention, it is possible to provide a magnetic disk device capable of executing the methods described above.

DETAILED DESCRIPTION OF THE INVENTION

Principle of Flying Height Measurement

Figure 1:
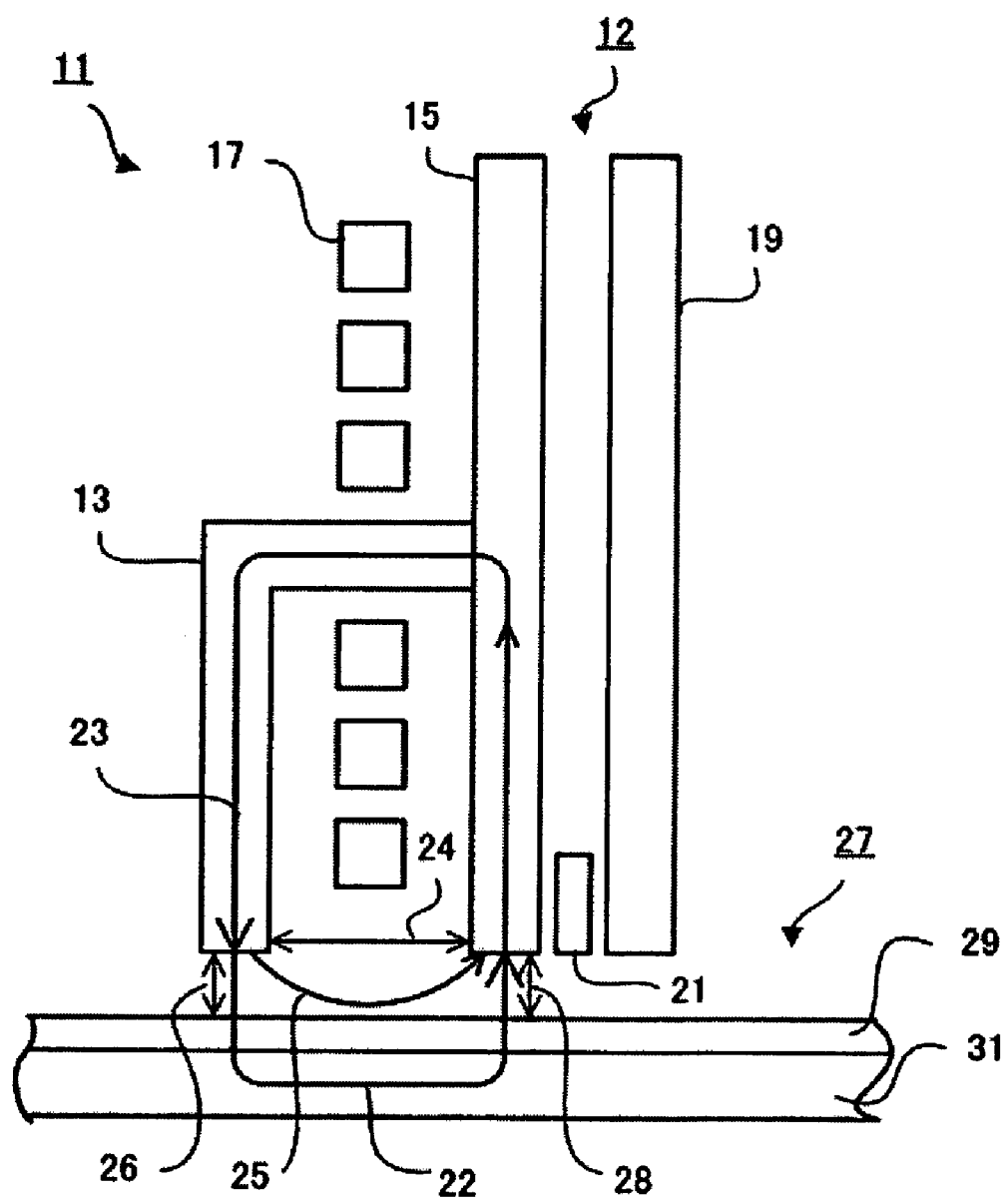
FIG. 1 is a side view schematically showing a magnetic disk based on the perpendicular magnetic recording system and a magnetic head.

FIG. 1 is a side view schematically showing a magnetic disk based on the perpendicular magnetic recording system and a magnetic head. The magnetic head is formed in a slider not shown as a hybrid type of head comprising a recording head 11 and a reproduction head 12 which are separated from each other. The recording head 11 comprises a main magnetic pole 13 comprising a magnetic thin film with high magnetic permeability, an auxiliary pole 15 and a thin film coil 17. The reproduction head 12 comprises an upper shield also used as an auxiliary magnetic pole 15, a lower shield 19, and a GMR reproduction element 21 provided therebetween. A write gap between the main magnetic pole 13 and the auxiliary magnetic pole 15 in the recording head 11 is wider as compared to that in a ring type of recording head for intra-surface magnetic recording.

In a case of a magnetic disk 27 for perpendicular magnetic recording, a soft magnetic layer 31 with high magnetic permeability and a vertical recording layer 29 made of such a material as CoCrPt are laminated on a substrate (not shown) made of such a material as glass or aluminum, and a protection layer or a lubrication layer (both not shown) is formed on the vertical recording layer 29. When a recording current is supplied to a coil 17 of the recording head 11 from a head amplifier provided separately, a synthesized magnetic flux 23 comprising an effective magnetic flux 22 and a leak magnetic flux 25 synthesized with each other flows in the main magnetic pole 13 as well as in the auxiliary magnetic pole 15. The effective magnetic flux 22 coming out of an edge of the main pole passes through the gap 26, vertical recording layer 29, soft magnetic layer 31, and a gap 28 and returns to the edge section of the auxiliary pole 15, while the leak magnetic flux 25 flows between an edge of the main magnetic pole 13 and an edge of the auxiliary magnetic pole 15. The effective magnetic flux 22 contributes to magnetic recording in the vertical recording layer 29, but the leak magnetic flux 25 does not contribute to magnetic recording.

The gaps 26, 28 correspond to a flying height of the recording head. The vertical recording layer 29 is a vertically anisotropic magnetic layer which is easily magnetized in a direction perpendicular to a surface of the magnetic disk. The effective magnetic flux 22 coming out of an edge of the main magnetic pole 13 to the gap 26 easily passes through the soft magnetic disk 31, so that the effective magnetic flux 22 passes through the vertical recording layer 29 in the vertical direction and magnetizes the vertical recording layer 29 in the vertical direction. When a flying height of the recording head 11 fluctuates, also a space between the gaps 26, 28 fluctuates. When a space between the gaps 26, 28 becomes larger, a magnetic resistance of a magnetic circuit through which the effective flux 22 passes through becomes larger, so that the effective magnetic flux 22 decreases, whereas, when a space between the gaps 26, 28 becomes smaller, a magnetic resistance of the magnetic circuit becomes smaller, so that the effective magnetic flux 22 increases. Even if the gaps 26, 28 fluctuate, the leak magnetic flux 25 changes little.

Fluctuations in a flying height of the recording head 11 appear as those of a magnetic flux flowing through the magnetic circuit of the recording head 11, which can electrically be detected as fluctuations in a self inductance of the coil 17 or as those in an impedance of the recording circuit. In the present invention, it was found as a result of simulation that a fluctuation rate of the self inductance is around 10% at the upper limit as well as at the lower limit of a flying height, and therefore detection of a fluctuation rate in a self inductance can practically be used for detection of a flying height.

Figure 2:
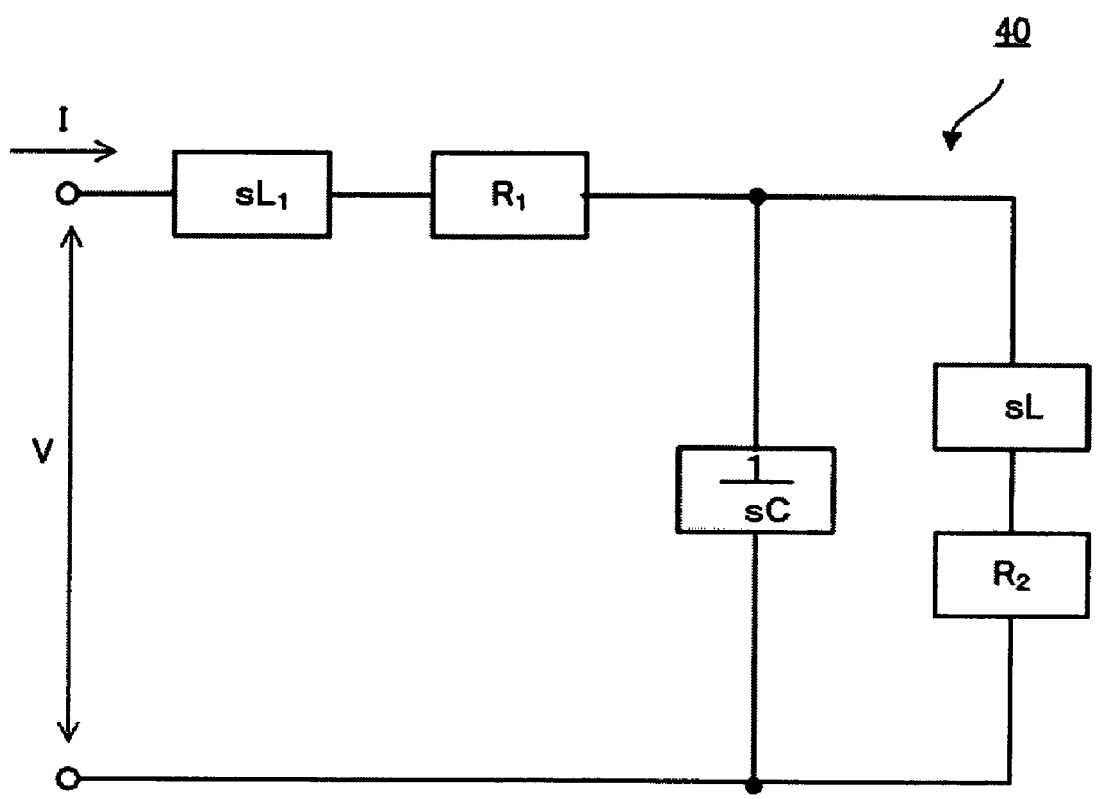
FIG. 2 is a view showing an equivalent circuit of a recording circuit in which a recording current flows from an head amplifier to a recording head.

FIG. 2 is an electrically equivalent circuit 40 of the recording circuit from the head amplifier via the wiring to the coil 17 of the recording head 11. The equivalent circuit 40 comprises a plurality of impedance elements. The sign s used for designating an impedance element indicates a Laplace operator, and s is equal to jω and therefore to 2πf (j is an imaginary unit, and f indicates a frequency of a current) (s=jω=j2πf). $L_1$ and $R_1$ indicate an inductance of a wiring path from a head amplifier to a coil in a recording head and a resistance respectively. C indicates a capacitance including those of the recoding head and the wiring path. L and $R_2$ indicate a self inductance and a resistance of the recording head 11. For the equivalent circuit shown in FIG. 2, an impedance Z in the recording head 11 when viewed from the head amplifier is as expressed by Equation 1 shown below because of the relation of V=ZI;

$$Z = \frac{R_1 + R_2 + (L + L_1 + CR_1R_2)s + (CLR_1 + CL_1R_2)s^2 + CLL_1s^3}{1 + CR_2s + CLs^2}$$ (Equation 1)

wherein V indicates a voltage loaded to the recording head 11 measured at an output terminal of the head amplifier, and I indicates a recording current.

Of the components of the impedance Z of the equivalent circuit 40, $L_1$, $R_1$, and C change little after production. A value of a coil resistance R in the recording head 11 fluctuates under the influence of a recording current or a temperature in the environment for use of the magnetic disk device because the value changes according to a temperature of the coil, while the self inductance L fluctuates under the influence of a flying height of the recording head 11. Therefore, by preparing a parameter table in which mutual relations between a flying height of the recording head 11 measured by the known method such as by using a laser beam or the like and the recording current I, a temperature of the environment for use thereof, and the impedance Z of the equivalent circuit is recorded, and also by dynamically measuring the impedance Z while data is written with the recording head and referring to the parameter table, a flying height of the recording head during the operation for recording user data or test data can be obtained.

Figure 3:
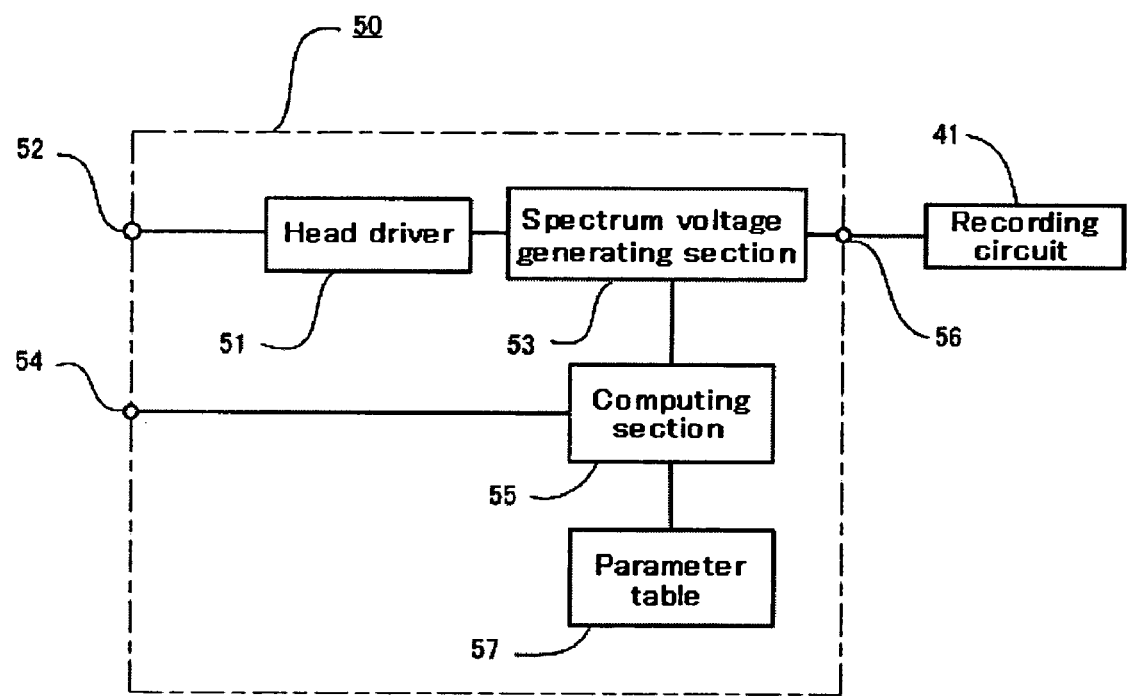
FIG. 3 is a view showing a first example of a flying height detection circuit.

A method of measuring a flying height by measuring an impedance of a recording circuit 41 based on a recording current applying the spectrum method is described below with reference to FIG. 3. A head amplifier 50 is a component of a magnetic disk device, and comprises a head driver 51, a spectrum voltage generating section 53, a computing section 55, and a parameter table 57. The recording circuit 41 comprises a wiring path from the head amplifier 50 to the recording head 11 and an impedance of the recording head 11, and can be expressed with the equivalent circuit 40 shown in FIG. 2. The spectrum voltage generating section 53, computing section 55, and parameter table 57 form a flying height measuring circuit.

Figure 4:
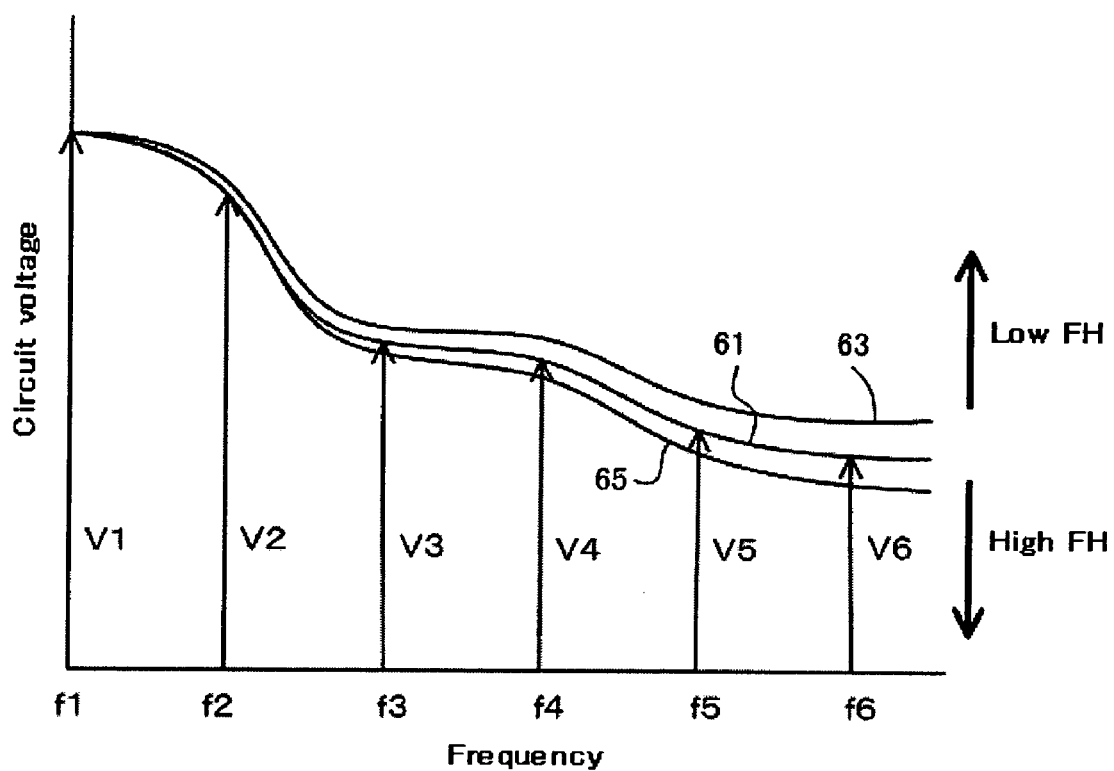
FIG. 4 is a view showing a frequency spectrum of a voltage generated in the recording circuit.

The head driver 51 receives a data signal modulated by a read/write channel (described as R/W channel hereinafter) of a magnetic disk device via a terminal 52, and generates a recording current to be supplied to the recording head 11 of the recording circuit 41. The recording current is expressed mainly with a rectangular waveform, and includes harmonic components of up to around 1 GHz against the basic frequency of around 100 MHz. The spectrum voltage generating section 53 generates a frequency spectrum of a voltage at an input terminal 56 of the recording circuit 41 when a recording current is supplied to the recording head 11. A recording current includes current components having various frequencies respectively, and a voltage at the input terminal 56 of the recording circuit 41 when the recording current is supplied to the recording circuit 41 includes various voltage components having various frequencies respectively. FIG. 4 is a view showing a frequency spectrum of a voltage at the input terminal 56 of the recording circuit 41. FIG. 4 shows a spectrum voltage according to a line 61 as a voltage V1 for the basic frequency f1 and spectrum voltages V2 to V6 for frequencies f2 to f1 each by an integral number larger as compared to f1 respectively.

An amplitude of a harmonic component included in a recording current becomes smaller as the frequency is higher, so that there is the tendency that the spectrum voltage becomes smaller as the frequency is higher. Further, because of the relations expressed by Equation 1 and V=ZI, when a flying height of the recording head 11 shown in FIG. 1 is higher, the self inductance L of the recording head 11 is smaller, so that an amplitude of the harmonic component in the spectrum voltage becomes smaller as shown by the line 65, and when the flying height becomes lower, the self inductance L will become larger with the amplitude of the harmonic wave portion in the spectrum voltage becoming larger. An amplitude of the basic frequency or of a relatively low frequency close to the basic frequency changes little even when the flying height fluctuates, so that the sensitivity to the flying height is rather low. A magnitude of a change in a spectrum voltage caused by fluctuation of a flying height is described herein as FH sensitivity.

A percentage of a change in an amplitude of a spectrum voltage corresponding to the harmonic component under the influence by a change in the self inductance L of a recording head is not always constant for all of the spectrum voltages V2 to V6, and a spectrum voltage having a specific frequency showing the high FH sensitivity. The FH sensitivity of each spectrum voltage changes according to the impedance configuration of the recording circuit 41, so that the change rates should be examined previously in a test process. In the following description, a spectrum voltage having a specific frequency component selected from the spectrum voltages having high FH sensitivities respectively is described as a detected spectrum voltage Vx, and a spectrum voltage with low FH sensitivity is described as a reference spectrum voltage Vb.

The spectrum voltage generating section 53 can be formed with a comb filter or a band pass filter with a narrow band width. The spectrum voltage generating section 53 generates a reference spectrum voltage Vb and at least one detected spectrum voltage Vx. When a comb filter is used, the reference spectrum voltage Vb and detected spectrum voltage Vx can easily be generated by setting a delay time. The spectrum voltage generating section 53 may be either an analog circuit or a digital circuit, but an analog circuit is preferable because the operating speed is higher.

The computing section 55 computes a Vx/Vb based on the reference spectrum voltage Vb and detected spectrum voltage Vx received from the spectrum voltage generating section 53 and refers to the parameter table 57. The parameter table 57 stores therein data for flying heights indicating a relation between the Vx/Vb and a flying height of the recording head 11 tested and confirmed in a test process before shipment. When a magnetic disk device comprises a plurality of recording heads, the parameter table 57 stores therein flying height data for each recording data.

The computing section 55 refers to and fetches a flying height from the parameter table 57 based on the computed Vx/Vb value, and sends a flying height signal from an output terminal 54 to an MPU unit in the magnetic disk device. The computing section 55 and parameter table 57 may be provided not only in the head amplifier 50 but in the MPU unit.

Figure 5:
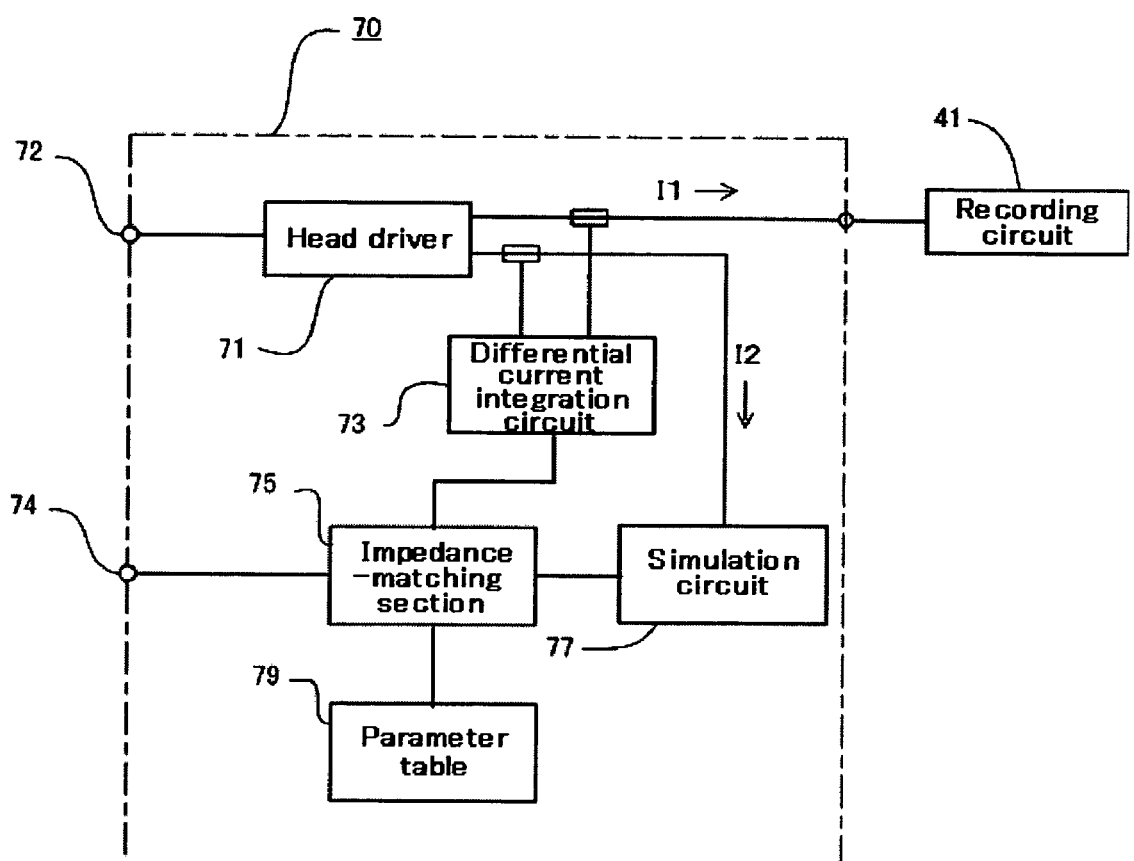
FIG. 5 is a view showing a second example of the flying height detection circuit.

A method of measuring a flying height by detecting an impedance of the recording circuit 41 by means of the model matching method is described with reference to FIG. 5. A head amplifier 70 is a component of a magnetic disk device, and comprises a head driver 71, a differential current integration circuit 73, simulation circuit 77, an impedance-matching section 75, and a parameter table 79. The differential current integration circuit 73, impedance-matching section 75, and simulation circuit 77 form a flying height measuring circuit.

A head driver 71 receives recorded data modulated by the R/W channel via a terminal 72, and loads the same voltage to the recording circuit 41 and to the simulation circuit 77. The recording circuit 41 can be expressed by the equivalent circuit 40 shown in FIG. 2, and when a voltage is loaded thereto from the head driver 71, the recording current I1 flows through the recording circuit 41. The simulation circuit 77 includes a component for an impedance or a transfer function Zm satisfying Equation 2 in correspondence to the equivalent circuit 40 expressed by Equation 1.

$$Zm = \frac{q_0 + q_1 s + q_2 s^2 + q_3 s^3}{1 + p_1 s + p_2 s^2} \quad \text{(Equation 2)}$$

Equation 1 and Equation 2 have the relationships as indicated by Equations 3 through 6:

$q0=R_1+R_2$                                                   Equation 3

$q1=L+L_1+CR_1R_2$                         Equation 4

$q2=CLR_1+CL_1R_2$                       Equation 5

$q3=CLL_1$                                                Equation 6

Therefore, by appropriately selecting a component for an impedance of the simulation circuit 77, it is possible to match the recording current I1 flowing through the recording circuit 41 to a simulation current I2 flowing through the simulation circuit 77. Values of the impedance elements q0 to q3 of the simulation circuit 77 can be changed according to a signal from the impedance-matching section 75. The differential current integration circuit 73 comprises an analog circuit or a digital circuit, detects the current I1 flowing through the recording circuit 41 and the simulation current I2 flowing through the simulation circuit 77, and integrates the difference once for a prespecified period of time.

Figure 6:
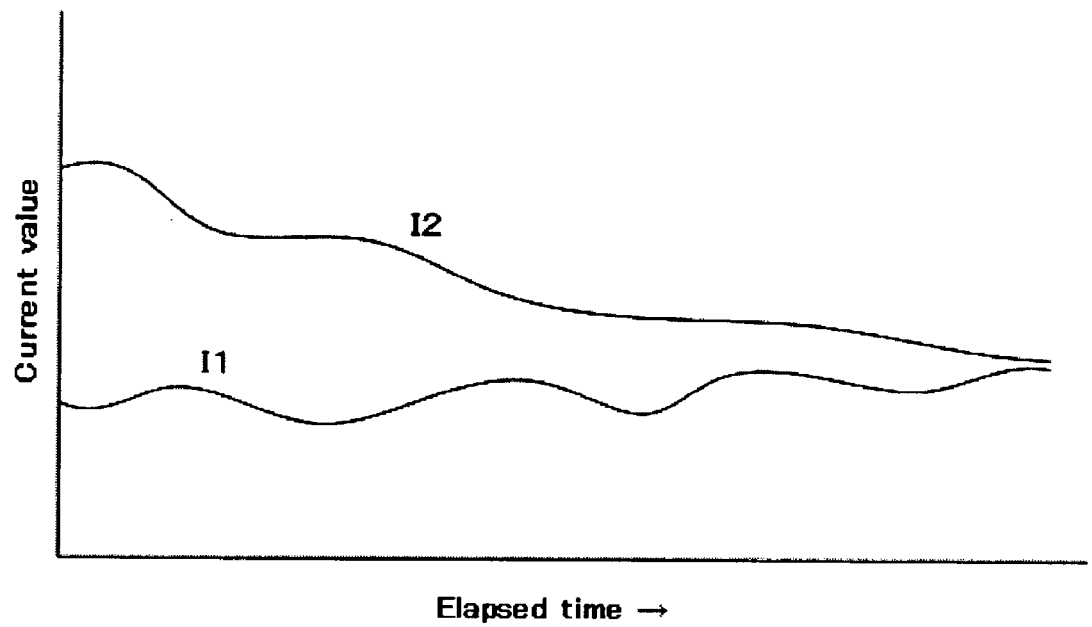
FIG. 6 is a view for illustrating operations of an integration circuit.
Figure 6:
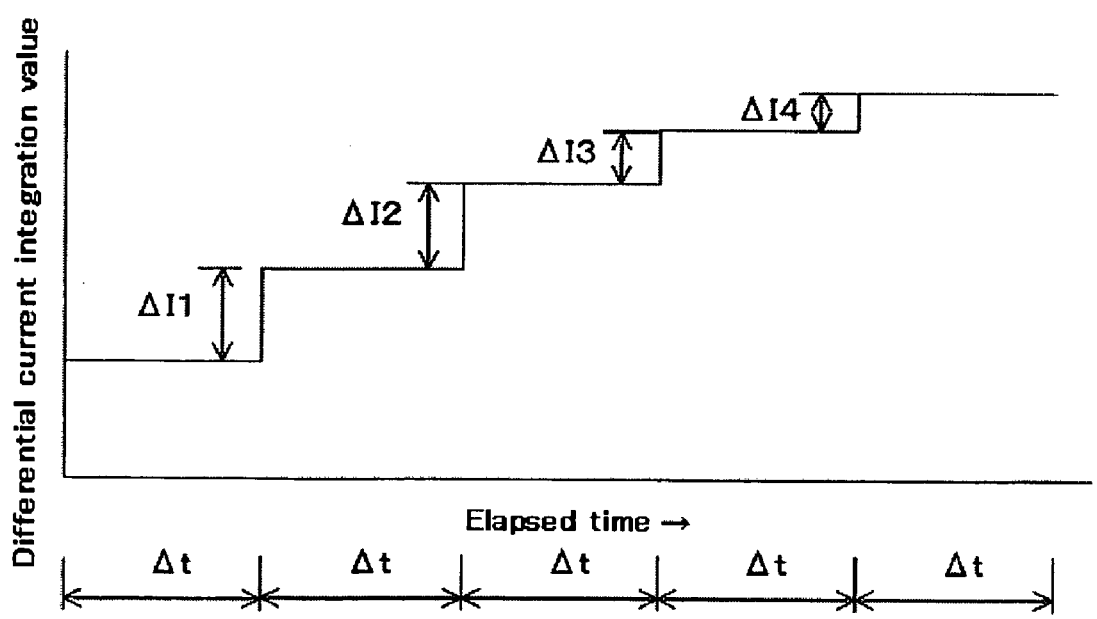

FIG. 6 is a view illustrating operations of the differential current integration circuit 73. As shown in the initial state of the elapsed time in FIG. 6(A), the recording current I1 and simulation current I2 generally take different values respectively unless the impedance elements q0 to q3 are adjusted. FIG. 6(A) shows a case where a value of the simulation current I2 is larger than a value of the recording current I1, but a value of the simulation current I2 may be smaller than that of the recording current I1. FIG. 6(B) shows the state where the differential current integration circuit 73 computes an integrated value of a value indicating a difference between the recording current I1 and the simulation current I2 once for every prespecified period of time Δt and accumulates the values. The differential current integration circuit 73 further computes change rates ΔI1 to ΔI4 of the integrated values and successively sends the computed change rates to the impedance-matching section 75.

When the change rate ΔI is larger than a prespecified threshold value, the impedance-matching section 75 generates an operation signal for changing each of the impedance elements q0 to q3 and sends the signal to the simulation circuit 77. The algorithm for changing the impedance elements q0 to q3 for converging the simulation current I2 to the recording current I1 is decided by making use of any known method such as the experiment planning method. When the impedance elements q0 to q3 are approximated to the corresponding values for the recording circuit 41 by operation signals from the impedance-matching section 75, the simulation current I2 converges to the recording current I1 with the difference ΔI of the integrated value gradually reduced even below the threshold value.

At this point of time, assuming that the recording current I1 is equal to the simulation current I2, it can be considered that the impedance Z of the recording circuit 41 has matched the impedance Zm of the simulation circuit 77. The parameter table 79 stores therein data indicating relations between the impedance elements q0 to q3 of the simulation circuit 77 previously measured in the test process and representative values of flying heights. When the magnetic disk device has a plurality of recording heads, the parameter table 79 stores the flying height data for each of the recording heads. The impedance-matching section 75 computes values of the impedance elements q0 to q3 from values of operation signals to the simulation circuit 77 when the difference ΔI of the integrated value is below the threshold value, obtains values of the flying heights by referring to the parameter table 79, and sends flying height signals from an output terminal 74 to the MPU. The impedance-matching section 75 and parameter table 79 may be realized with an MPU unit in the magnetic disk device.

General Configuration of a Magnetic Disk Device

Figure 7:
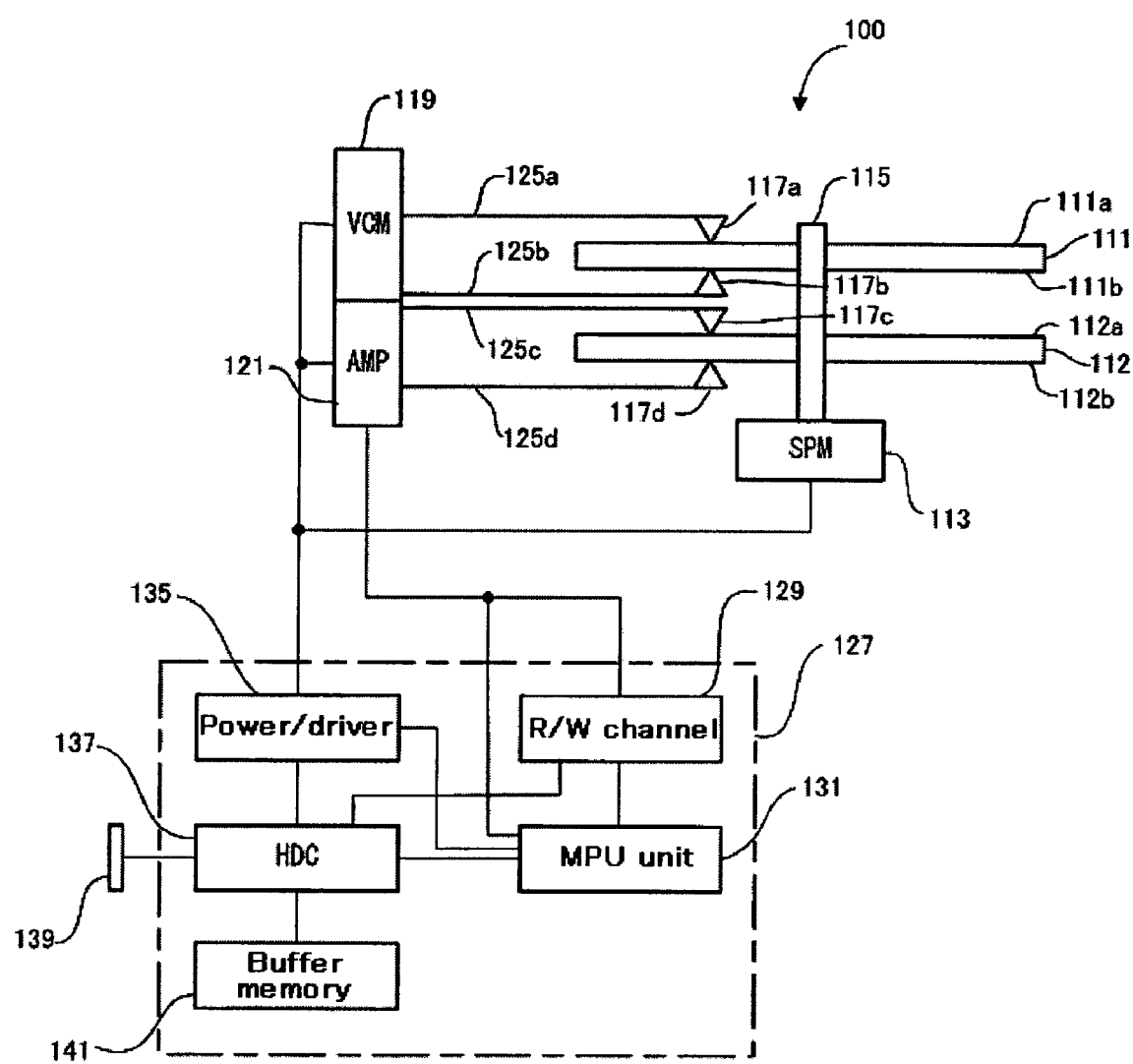
FIG. 7 is a block diagram showing a key section of a magnetic disk device.

FIG. 7 is a general block diagram showing a magnetic disk device 100 comprising the circuit for measuring a flying height of a recording head as described above. The magnetic disk device 100 comprises two sheets of magnetic disks 111, 112 for perpendicular magnetic recording. The magnetic disk 111 comprises recording surfaces 111a, 111b, and the magnetic disk 112 comprises recording surfaces 112a, 112b. Main components of each recording surface include a protection layer, a vertical recording layer, and a soft magnetic layer each formed on a substrate. The magnetic disks 111, 112 are fixed to a spindle shaft 115 with a prespecified space therebetween, and are simultaneously rotated by a spindle motor (described as SPM hereinafter) 113.

Provided in the magnetic disk device 100 are four head/sliders 117a, 117b, 117c, 117d corresponding to the recording surfaces 111a, 111b, 112a, 112b respectively. Formed in each head/slider is a magnetic head comprising an induction type of head for recording and a GMR head for reproduction which are integrated into a hybrid type of head. The head/sliders 117a, 117b, 117c, 117d are attached to head support mechanisms 125a, 125b, 125c, and 125d respectively. The head support mechanism comprises a flexure, suspension assembly, a carriage, and a voice coil motor (described as VCM hereinafter) 119, and positions each magnetic head at a prespecified position on a corresponding magnetic disk.

A head amplifier 121 is attached to the head support mechanism. The technique for attaching a head amplifier to the head support mechanism is generally known as chip on suspension (COS) or arm electronics (AE). The head amplifier 121 comprises a read/write driver (described as R/W driver hereinafter), a driver register, a read/write switching circuit (described as R/W switching circuit), and a flying height measuring circuit which is a main component for realizing the present invention, and the components are described in detail hereinafter.

Further the magnetic disk device 100 comprises a circuit board 127 with a R/W channel 129, an MPU unit 131, a power/driver 135, a hard disk controller (HDC) 137, and a buffer memory 141 packaged thereon. The R/W channel 129 comprises a modulation circuit for converting a data bit array to a bit array to be recorded on a magnetic disk and a demodulation circuit for executing conversion in the reverse direction, a parallel/serial converter for converting parallel data to and from serial data, and a variable gain amplifier (VGA) for adjusting a reproduced signal to a constant voltage level.

The MPU unit 131 comprises an MPU for controlling operations of the magnetic disk device 100 as a whole, a ROM for storing therein various types of programs, and a RAM used for execution of the programs or as a work area. The programs include those for measuring a flying height or for executing a data recording method. The hard disk controller 137 comprises a servo controller for controlling a seek operation, a track following operation and the like based on servo data, a buffer controller for controlling the buffer memory 141, and an ECC circuit for generating corrected bits for data bits sent from a host computer or correcting user data reproduced from the magnetic disk. The buffer memory 141 is used for realizing high speed data transfer between the host computer and the magnetic disk device.

The power/driver 135 comprises an SPM driver for supplying an operating current to the SPM 113, a VCM driver for supplying an operating current to the VCM 119, a DA converter, and a power circuit. Further the power/driver 135 comprises a circuit for supplying a current to a heater control circuit for the heat amplifier described hereinafter. Attached to the circuit board 127 is an interface connector 139 for data communications with the host computer.

Configuration of the Head Amplifier

Figure 8:
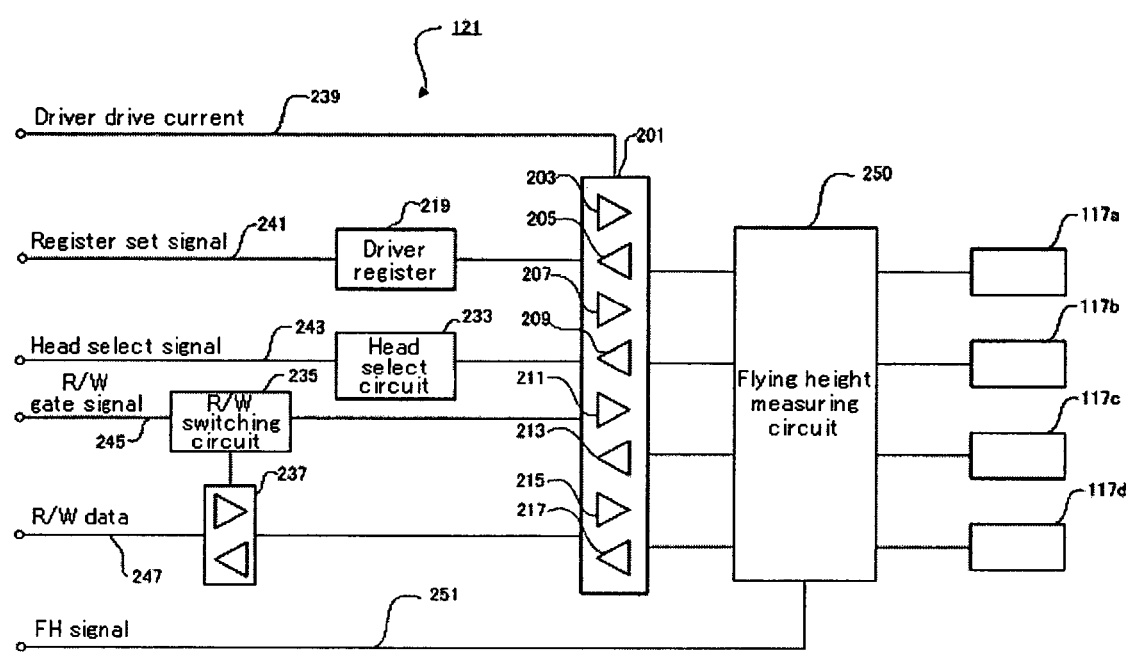
FIG. 8 is a block diagram showing a head amplifier according to an embodiment of the invention.

FIG. 8 is a general block diagram for the head amplifier 121 having a flying height measuring circuit provided therein. An R/W driver 201 receives a driver drive current from the power/driver 135 through a line 239. The R/W driver 201 comprises write drivers 203, 207, 211, 215, and supplies a recording current to recording heads of the head/sliders 117a, 117b, 117c, and 117d. The R/W driver 201 further comprises read amplifiers 205, 209, 213, 217, supplies a bias current to reproduction heads of the head/sliders 117a, 117b, 117c, 117d, and detects a change of an electric resistance by a magnetic field recorded in the magnetic disk to reproduce the recorded data.

The R/W driver 201 has a circuit for generating a rectangular waveform current, a circuit for generating an overshoot current, and a circuit for synthesizing the currents. The R/W driver 201 can receive a digital signal from a driver register 219 and change magnitudes of a component of the rectangular waveform current and that of the overshoot current in the recording current discretely. The driver register 219 comprises a register for storing therein a digital set value concerning a rectangular waveform current in a recording current and a register for storing therein a digital set value concerning an overshoot current. Setting of the driver register 219 is performed by the MPU unit 131 via a line 241. The R/W switching circuit 235 receives an R/W gate signal concerning one operation mode of either a recording operation or a reproduction operation generated by the HDC 137 via a line 245, and switches an operation mode of the R/W driver 201 and the R/W buffer 237.

The R/W buffer 237 temporally stores user data therein when transferring the user data to be recorded or reproduced to and from the R/W channel 129 through a line 247. A head select circuit 233 receives a head select signal generated by the HDC 137 through a line 243 to activate a magnetic head in any one of the four head/sliders 117a, 117b, 117c, and 117d.

A flying height measuring circuit 250 is connected to a section between the R/W driver 201 and each of the head/sliders 117a, 117b, 117c, and 117d. The circuit described with reference to FIG. 3 or FIG. 5 may be employed as the flying height measuring circuit 250, or other known impedance measuring circuit may be employed for the same purpose. The flying height measuring circuit 250 may be provided not in the head amplifier 121, but, for instance, in the MPU unit 131. The flying height measuring circuit 250 measures a self inductance or impedance associated with a flying height of a recording head by making use of a recording current flowing through a recording head of the head/slider selected by the head select circuit 233 to measure a flying height of the recording head.

The recording current for measuring a flying height may be a current for recording test data or for recording user data. An operation of the R/W driver 201 for writing user data or test data in a magnetic disk by supplying a recording current to a recording head and an operation of the flying height measuring circuit 250 for measuring a flying height are carried out concurrently. Therefore, a value of a flying height measured by the flying height measuring circuit 250 corresponds to a flying height of the recording head when recording data.

The flying height measuring circuit 250 generates a recording head flying height signal (FH signal) and sends the signal through a line 251 to the MPU unit 131. Also the configuration is allowable in which the flying height measuring circuit 250 stores a threshold value therein, compares a measured flying height to the threshold value, and sends an FH signal to the MPU unit 131 only when the measured flying height is recognized as abnormal.

An FH signal concerning a flying height of a recording head may be used for various purposes in a magnetic disk device. As one of the causes for abnormality of a flying height of a recording head, collision between dust deposited on a magnetic disk and a recording head can be considered. When data recording is continued in the state where a flying height is unstable, the magnetic layer may not sufficiently be magnetized, or data may be written in an adjoining track, which degrades reliability of the recording operation. In this case, if influence by dust is transitional, it is effective to once stop the recording operation and resume the recording operation after the flying height is stabilized.

Figure 9:
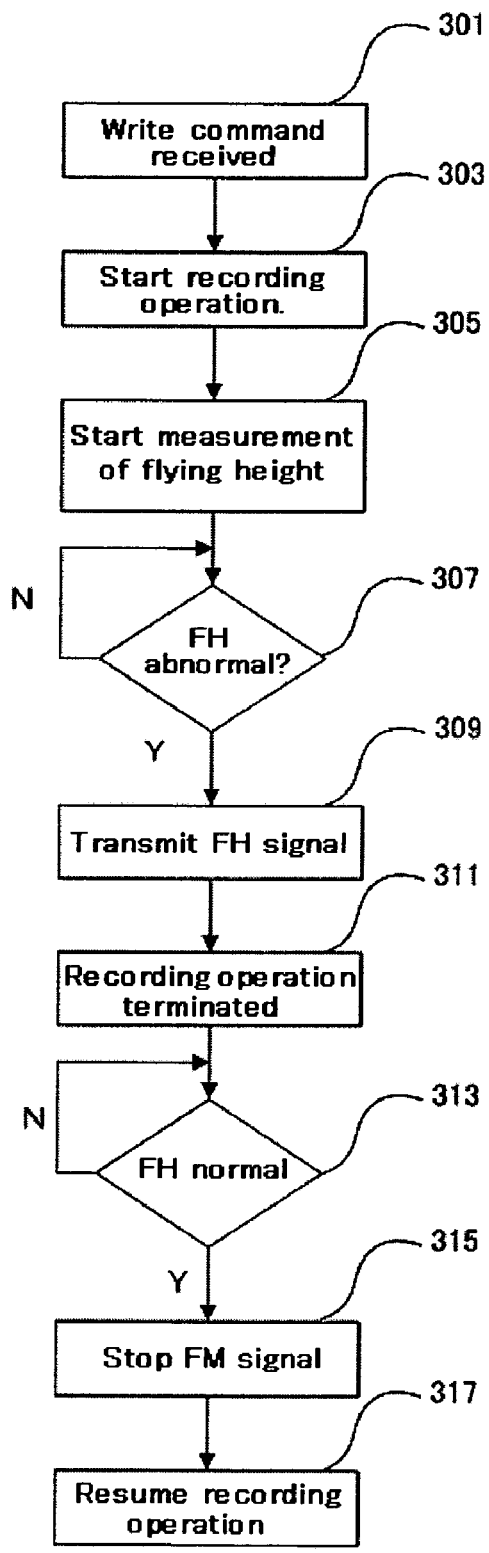
FIG. 9 is a flow chart illustrating a method of stabilizing a recording operation according to an embodiment of the invention.

A method of stabilizing a recording operation by measuring a flying height of a recording head in a magnetic disk device 100 connected to a host computer with an interface connector 139 is described with reference to the related flow chart shown in FIG. 9. In block 301, when the magnetic disk device 100 receives a write command and user data from a host computer, the MPU unit 131 sends the user data to the R/W channel 129 and controls the R/W channel or the head amplifier 121 for starting the recording operation. In block 303, the magnetic disk device starts writing the user data in a magnetic disk to which the selected recording head corresponds.

In block 305, the flying height measuring circuit 250 starts measurement of a flying height of a recording circuit in which a recording current flows. The flying height measuring circuit 250 outputs an FH signal when a flying height is off from a prespecified value and abnormal. In block 307, when it is detected that a flying height is abnormal, the flying height measuring circuit 250 sends an FH signal to the MPU unit 131 in block 309.

In block 311, the MPU unit 131 having received the FH signal provides controls over the magnetic disk device for terminating the recording operation, and accumulates user data sent from the host computer in the buffer memory 141 during this period of time. The flying height measuring circuit 250 continues measurement of a flying height even after transmission of the FH signal, and when it is determined in block 313 that the flying height of a recording head has returned to the normal state, transmission of the FH signal is stopped in block 315. When the MPU unit 131 recognizes that the FH signal has disappeared, the MPU unit 131 controls the magnetic disk device 100 to resume the recording operation in block 317. Abnormality of a flying height may be determined by the MPU unit 131. In this case, the flying height measuring circuit 250 sends a value of a flying height to the MPU unit 131.

Figure 10:
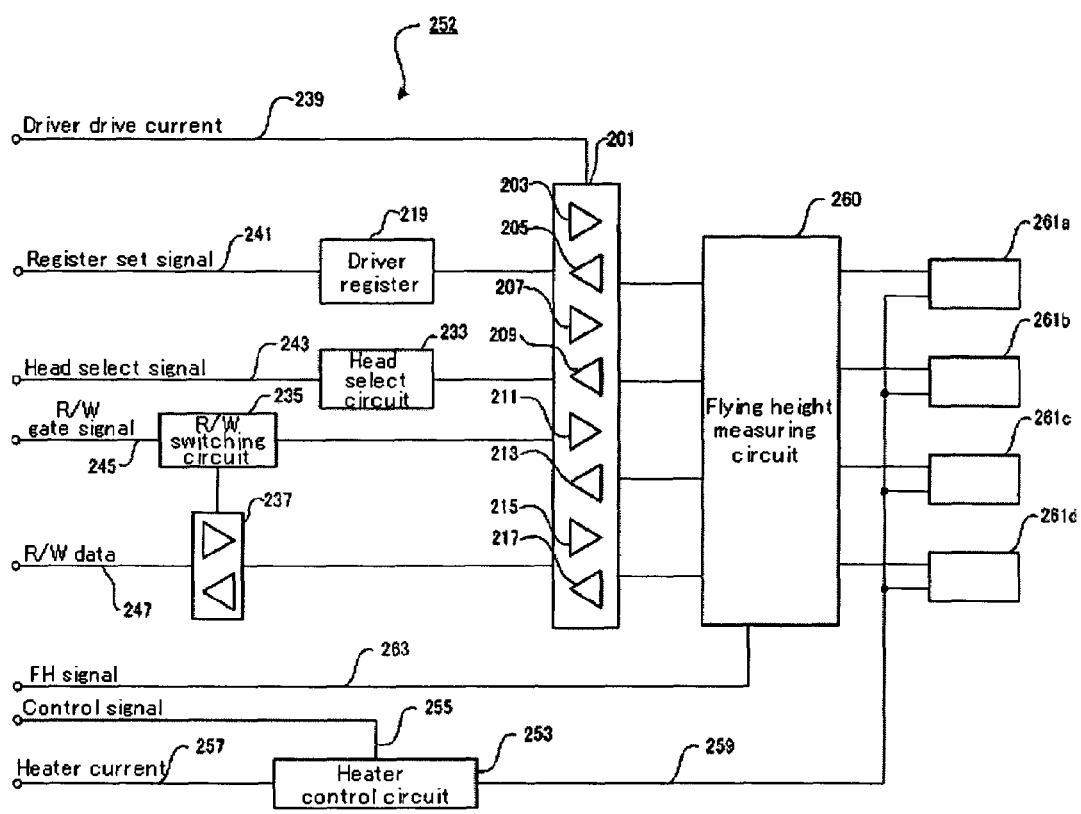
FIG. 10 is another block diagram showing the head amplifier according to an embodiment of the invention.

Next a magnetic disk device capable of controlling a flying height of a recording head by measuring a flying height is described with reference to FIG. 10. FIG. 10 is a general block diagram showing a head amplifier 252 which can be applied to the magnetic disk device 100 in place of the head amplifier 121 described with reference to FIG. 8. A head amplifier 252 has a flying height measuring circuit 260 and is connected to head/sliders 261*a*, 261*b*, 261*c*, and 261*d*. Each of the head/sliders 261*a*, 261*b*, 261*c*, and 261*d* has a heater embedded near a recording head thereof, and by flowing a current through the heater to generate heat therein and control a thermal expansion rate of a magnetic pole of the recording head, a flying height of the recording head can be adjusted.

A heater current is supplied from a heater control circuit 253 to a heater in each head/slider. A heater current is supplied from the power/driver 135 through a line 257 to the heater control circuit 253. The heater control circuit 253 receives a control signal from the MPU unit 131 through a line 255, and controls a heater current supplied through a line 259 to the head/slider. The flying height measuring circuit 260 computes a flying height from an impedance of the recording circuit obtained based on a value of a recording current when the magnetic disk device starts a recording operation, and sends the computed value as an FH signal through a line 263 to the MPU unit 131. Other portions of the head amplifier 252 are the same as those of the head amplifier 121 shown in FIG. 8.

Figure 11:
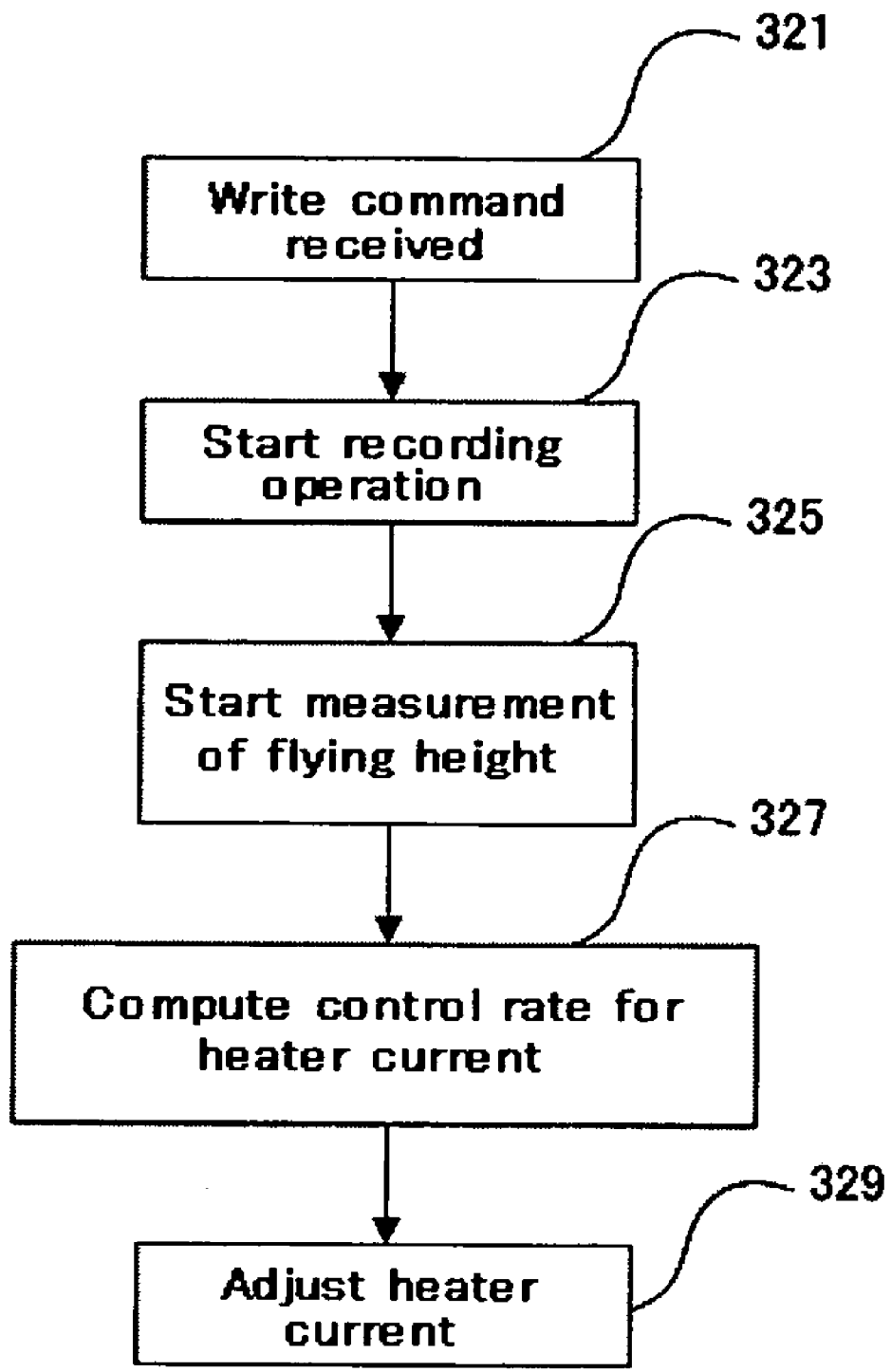
FIG. 11 is a flow chart illustrating a method of controlling a flying height according to an embodiment of the invention.

A method of controlling a flying height of a recording head when the magnetic disk device comprising the head amplifier 252 having the configuration as described above is connected to a host computer and carries out an operation for recording user data is described below with reference to the flow chart shown in FIG. 11. When the magnetic disk device 100 receives a write command and user data from the host computer in block 321, the MPU unit 131 sends the user data to the R/W channel 129 and provides controls over the R/W channel or the head amplifier 252 to start a recording operation, and the magnetic disk device starts writing the user data in a magnetic disk corresponding to the recording head selected in block 323.

In block 325, the flying height measuring circuit 260 starts measurement of a flying height based on an impedance of a recording circuit through which a recording current is flowing. The flying height measuring circuit 260 successively outputs flying height signals to the MPU unit 131 through the line 263. In block 327, the MPU unit 131 having received flying height signals successively compares each of the received flying height signals through the line 261 to a reference value of a flying height, and sends a control signal for controlling a heater current through a line 255 to the heater control circuit 253 to adjust the flying height to a value close to the reference value.

More specifically, when a flying height signal received through the line 263 is larger than the reference value, the heater current is increased so that a flying height of a recording head is made smaller, while in turn, when a flying signal is smaller than the reference value, the heater current is reduced so that a flying height of a recording head is made larger. In this case, not a flying height of the entire head/slider, but a flying height of only the recording head is controlled.

The control as described above is possible by measuring a flying height based on an impedance of a recording circuit.

As described above, by dynamically measuring a flying height of a recording head during an operation of recording data and utilizing the result for controlling a thermal expansion rate of the recording head, it is possible to provide controls with higher precision as compared to a case where indirect parameters for a flying height such as a temperature in an environment for use of a magnetic disk device or a timing for an recording operation are employed for flying height control. The descriptions for measurement of a flying height above assume use of a magnetic disk device based on the perpendicular magnetic recording system and a recording head used in the magnetic disk device, but the principles of the present invention are not limited to the perpendicular magnetic recording system, and are also applicable to the intra-surface magnetic recording system. However, an impedance of a recording circuit including a magnetic disk based on the intra-surface magnetic recording system changes only a little according to fluctuations of a flying height, so that a technique for measuring an impedance with high precision is required.

To control a flying height of a recording head, also a method of controlling an ampere of a recording current may be employed. As an ampere of a recording current relates to a thermal expansion rate of a recording head, the configuration is allowable in which the MPU unit 131 having received a flying height signal changes setting of the driver register 219 shown in FIG. 10 to control an ampere of the recording current. More specifically, when a flying height signal having been received through the line 263 is larger than a reference value for a flying height, the MPU unit 131 increases the recording current to reduce a flying height of the recording head, and when the received signal is smaller than the reference value, the MPU unit 131 reduces the recording current to make larger a flying height of the recording head.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of measuring a flying height of a recording head in a magnetic disk device, said method comprising:
   supplying a recording current to a recording circuit including said recording head and wiring connected to said recording head to record data in the magnetic disk; and
   computing a flying height of said recording head from an impedance of said recording circuit obtained based on a value of said recording current;
   wherein computing said flying height includes changing a value of said impedance based on a difference between a value of a current flown in a simulation circuit including a variable impedance and a current value flowing in said recording circuit.

2. The measuring method according to claim 1, wherein said data is user data sent from a host computer.

3. The measuring method according to claim 1, wherein said magnetic disk has a vertical recording layer.

4. The measuring method according to claim 1,
   wherein computing said flying height includes computing a ratio of a voltage component that is fluctuated slightly by a change in an impedance of said recording circuit versus another voltage component that is fluctuated substantially by a change in an impedance of said recording circuit, in a frequency spectrum of a voltage appearing on said recording circuit.

5. The measuring method according to claim 1,
   wherein computing said flying height includes referring to a parameter table with flying height corresponding to values of impedances of said recording circuit stored therein.

6. A method of recording user data in a magnetic disk device including a head/slider with a recording head formed thereon and a magnetic disk including a vertical recording layer, said method comprising:
   supplying a recording current to a recording circuit including said recording head and wiring connected to said recording head;
   computing a flying height of said recording head from an impedance of said recording circuit obtained based on a value of said recording current; and
   stopping said recording operation based on a value of said flying height;
   wherein computing said flying height includes changing a value of said impedance based on a difference between a value of a current flown in a simulation circuit including a variable impedance and a current value flowing in said recording circuit.

7. The recording method of claim 6 further including:
   starting said recording operation based on said flying height in succession to stopping said recording operation.

8. A method of recording user data in a magnetic disk device including a head/slider with a recording head formed thereon and a magnetic disk including a vertical recording layer, said method comprising:
   supplying a recording current to a recording circuit including said recording head and wiring connected to said recording head to start an operation for recording user data in said magnetic disk;
   computing a flying height of said recording head from an impedance of said recording circuit obtained based on a value of said recording current; and
   adjusting a flying height of said recording head based on said flying height;
   wherein computing said flying height includes changing a value of said impedance based on a difference between a value of a current flown in a simulation circuit including a variable impedance and a current value flowing in said recording circuit.

9. The recording method according to claim 8,
   wherein adjusting a flying height includes controlling a current for a heater provided in said head/slider.

10. The recording method according to claim 8,
    wherein adjusting a flying height includes controlling an ampere of said recording current.

11. A magnetic disk device including:
    a magnetic disk;
    a head/slider with a recording head for recording data in said recording magnetic disk formed therein;
    wiring connected to said recording head;
    a head driver configured to generate a recording current to be supplied to said recording head; and
    a flying height measuring circuit connected to said driver as well as to said wiring for measuring an impedance of a recording circuit including said wiring and said recording head from a recording current flowing through said wiring, and outputting a flying height signal for said recording head;

wherein said flying height measuring circuit has a simulation circuit including a variable impedance corresponding to said recording circuit.

12. The magnetic disk according to claim 11,
wherein said recording current is a recording current for recording user data in said magnetic disk.

13. The magnetic disk device according to claim 11,
wherein said magnetic disk includes a vertical recording layer.

14. The magnetic disk device according to claim 11,
wherein said flying height measuring circuit includes a spectrum voltage generating section configured to generate a frequency spectrum of a voltage generated in said recording circuit.

15. The magnetic disk device according to claim 11,
wherein said flying height measuring circuit includes a parameter table with flying heights corresponding to values of impedances of said recording circuit stored therein.

16. The magnetic disk device according to claim 11,
wherein said flying height measuring circuit is formed in a head amplifier mounted in a head support mechanism for said magnetic disk device.

17. The magnetic disk device according to claim 11 further including a heater for changing a thermal expansion rate of a recording head formed in said head/slider; and
a heater control circuit which is controlled according to a control signal generated based on said flying height signal to adjust the heater.

18. The magnetic disk device according to claim 11 further including:
an MPU unit configured to stop a recording operation in response to a flying height signal outputted from said flying height measuring circuit.

* * * * *

UNITED STATES PATENT AND TRADEMARK OFFICE
CERTIFICATE OF CORRECTION

PATENT NO. : 7,440,217 B2 Page 1 of 1
APPLICATION NO. : 11/337113
DATED : October 21, 2008
INVENTOR(S) : Ono et al.

It is certified that error appears in the above-identified patent and that said Letters Patent is hereby corrected as shown below:

Column 14, Claim 11, Line 58, change "said recording magnetic disk" to -- said magnetic disk --.

Signed and Sealed this

Thirtieth Day of December, 2008

JON W. DUDAS
*Director of the United States Patent and Trademark Office*